US012322163B2

(12) United States Patent
Sato

(10) Patent No.: US 12,322,163 B2
(45) Date of Patent: Jun. 3, 2025

(54) NEGATIVE EXAMPLE AVAILABILITY DECIDING APPARATUS, NEGATIVE EXAMPLE AVAILABILITY DECIDING METHOD, AND PROGRAM

(71) Applicant: Sony Interactive Entertainment Inc., Tokyo (JP)

(72) Inventor: Shogo Sato, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 385 days.

(21) Appl. No.: 18/001,800

(22) PCT Filed: Jul. 3, 2020

(86) PCT No.: PCT/JP2020/026261
§ 371 (c)(1),
(2) Date: Dec. 14, 2022

(87) PCT Pub. No.: WO2022/003972
PCT Pub. Date: Jan. 6, 2022

(65) Prior Publication Data
US 2023/0290127 A1  Sep. 14, 2023

(51) Int. Cl.
*G06V 10/776* (2022.01)
*G06V 10/764* (2022.01)
(Continued)

(52) U.S. Cl.
CPC .......... *G06V 10/776* (2022.01); *G06V 10/764* (2022.01); *G06V 10/774* (2022.01); *G06V 10/82* (2022.01)

(58) Field of Classification Search
CPC .. G06V 10/776; G06V 10/774; G06V 10/764; G06V 10/82
See application file for complete search history.

(56) References Cited

U.S. PATENT DOCUMENTS 7,231,652 B2   6/2007  Gutta
7,383,241 B2*  6/2008  Velipasaoglu ......... G06Q 10/04
                                                        702/179
(Continued)

FOREIGN PATENT DOCUMENTS

JP       2004527841 A       9/2004

OTHER PUBLICATIONS

International Search Report for corresponding PCT Application No. PCT/JP2020/026261, 4 pages, Oct. 6, 2020.
(Continued)

*Primary Examiner* — Manav Seth
(74) *Attorney, Agent, or Firm* — Kilpatrick Townsend & Stockton LLP

(57) ABSTRACT

There are provided a negative example availability deciding apparatus, a negative example availability deciding method, and a program that enable reuse of training data. A positive example evaluation training section generates a positive example evaluation classifier trained with target data as a positive example. A negative example evaluation training section generates a negative example evaluation classifier trained with target data as a negative example. An availability deciding section determines the classification accuracy of the positive example evaluation classifier and the classification accuracy of the negative example evaluation classifier by using evaluation data. The availability deciding section decides, on the basis of the classification accuracy of the positive example evaluation classifier and the classification accuracy of the negative example evaluation classifier, whether or not to use target data as negative example training data for training another classifier.

7 Claims, 11 Drawing Sheets

(51) Int. Cl.
*G06V 10/774* (2022.01)
*G06V 10/82* (2022.01)

(56) References Cited

U.S. PATENT DOCUMENTS

| | | | | |
|---|---|---|---|---|
| 7,383,260 | B2 * | 6/2008 | Smith | G06V 10/809 |
| | | | | 707/999.005 |
| 7,542,894 | B2 * | 6/2009 | Murata | G06F 40/20 |
| | | | | 704/9 |
| 7,873,642 | B2 * | 1/2011 | Smith | G06V 10/809 |
| | | | | 707/688 |
| 8,015,132 | B2 * | 9/2011 | Xu | G06V 10/771 |
| | | | | 706/20 |
| 10,007,863 | B1 * | 6/2018 | Pereira | G06T 7/337 |
| 10,997,476 | B2 * | 5/2021 | Lombardo | G06V 40/168 |
| 12,189,725 | B2 * | 1/2025 | Subber | G06F 16/906 |
| 2002/0162107 | A1 | 10/2002 | Gutta | |
| 2013/0060769 | A1 * | 3/2013 | Pereg | G06F 16/3338 |
| | | | | 707/765 |
| 2018/0047071 | A1 * | 2/2018 | Hsu | G06Q 30/0282 |
| 2021/0182736 | A1 * | 6/2021 | Hasegawa | G06N 3/045 |
| 2022/0222585 | A1 * | 7/2022 | Iwata | G06F 17/11 |
| 2023/0195851 | A1 * | 6/2023 | Kusano | G06F 18/217 |
| | | | | 707/737 |
| 2024/0303482 | A1 * | 9/2024 | Beggel | G06V 10/774 |

OTHER PUBLICATIONS

Kordumova, Svetlana, et al., "Best practices for Learning Video Concept Detectors from Social Media Examples" Multimedia Tools and Applications, Springer Science-Business Media New York, 26 pages, Jun. 2014 (for relevancy see Non-Pat. Lit. #1).

* cited by examiner

NEGATIVE EXAMPLE AVAILABILITY DECIDING APPARATUS, NEGATIVE EXAMPLE AVAILABILITY DECIDING METHOD, AND PROGRAM

TECHNICAL FIELD

The present invention pertains to a negative example availability deciding apparatus, a negative example availability deciding method, and a program.

BACKGROUND ART

To generate a classifier having high classification accuracy, it is necessary to collect a sufficient number of pieces of training data to be used as positive examples and negative examples, and train the classifier with this training data.

SUMMARY

Technical Problem

In a case where training data that has been used as a negative example for one classifier is later reused as a negative example for another classifier, the training data cannot be reused without any change, and it is necessary to exclude, from this training data, data that should be handled as a positive example in the other classifier. For example, in a case where training data based on cat images is included in training data used as negative examples for a classifier that identifies whether or not there is a dog image, it is necessary to exclude the training data based on cat images from negative examples for a classifier that identifies whether or not there is a cat image. This is because the classification accuracy of the classifier that identifies whether or not there is a cat image will worsen when the training data based on cat images is used as not only a positive example but also a negative example.

However, pieces of training data used as negative examples for one classifier are associated with various items in a mixed state, and each of them does not always have a label indicating the associated item. Accordingly, it is difficult to extract data that needs to be excluded from this training data.

The present invention is made in the light of the circumstances described above, and one objective thereof is to provide a negative example availability deciding apparatus, a negative example availability deciding method, and a program that enable reuse of training data.

Solution to Problem

In order to solve the problem described above, a negative example availability deciding apparatus according to the present invention includes a first classifier generation section that generates a first classifier trained with given target data as a positive example, a second classifier generation section that generates a second classifier trained with the target data as a negative example, a classification accuracy determination section that determines classification accuracy of the first classifier and classification accuracy of the second classifier by using given evaluation data, and an availability deciding section that decides, on the basis of the classification accuracy of the first classifier and the classification accuracy of the second classifier, whether or not to use the target data as negative example training data for training another classifier.

In one aspect of the present invention, the first classifier generation section generates the first classifier that is trained with the target data and common positive example data as positive examples and with common negative example data as a negative example, and the second classifier generation section generates the second classifier that is trained with the common positive example data as a positive example and with the target data and the common negative example data as negative examples.

In this aspect, the negative example availability deciding apparatus may further include a third classifier generation section that generates a third classifier trained with the common positive example data as a positive example and with the common negative example data as a negative example, and a target data specifying section that uses the third classifier to specify the target data from a plurality of pieces of given negative example training data.

Further, the target data specifying section may use the third classifier and positive example training data that is to be used as a positive example for training the other classifier, to specify the target data from the plurality of pieces of negative example training data.

In addition, in one aspect of the present invention, the first classifier generation section generates, for each of a plurality of target data groups, the first classifier that is associated with a corresponding one of the target data groups and that is trained with a plurality of pieces of the target data included in the target data group as positive examples, the second classifier generation section generates the second classifier that is associated with the target data group and that is trained with a plurality of pieces of the target data included in the target data group as negative examples, the classification accuracy determination section determines classification accuracy of the first classifier associated with the target data group and classification accuracy of the second classifier associated with the target data group, and the availability deciding section decides, on the basis of the classification accuracy of the first classifier associated with the target data group and the classification accuracy of the second classifier associated with the target data group, whether or not to use the plurality of pieces of target data included in the target data group as negative example training data for training the other classifier.

Further, a negative example availability deciding method according to the present invention includes a step of generating a first classifier trained with given target data as a positive example, a step of generating a second classifier trained with the target data as a negative example, a step of determining classification accuracy of the first classifier and classification accuracy of the second classifier by using given evaluation data, and a step of deciding, on the basis of the classification accuracy of the first classifier and the classification accuracy of the second classifier, whether or not to use the target data as negative example training data for training another classifier.

Moreover, a program according to the present invention causes a computer to execute a procedure for generating a first classifier trained with given target data as a positive example, a procedure for generating a second classifier trained with the target data as a negative example, a procedure for determining classification accuracy of the first classifier and classification accuracy of the second classifier by using given evaluation data, and a procedure for deciding, on the basis of the classification accuracy of the first classifier and the classification accuracy of the second classifier, whether or not to use the target data as negative example training data for training another classifier.

DESCRIPTION OF EMBODIMENT

In the following description, one embodiment of the present invention will be explained in detail on the basis of the drawings.

Figure 1:
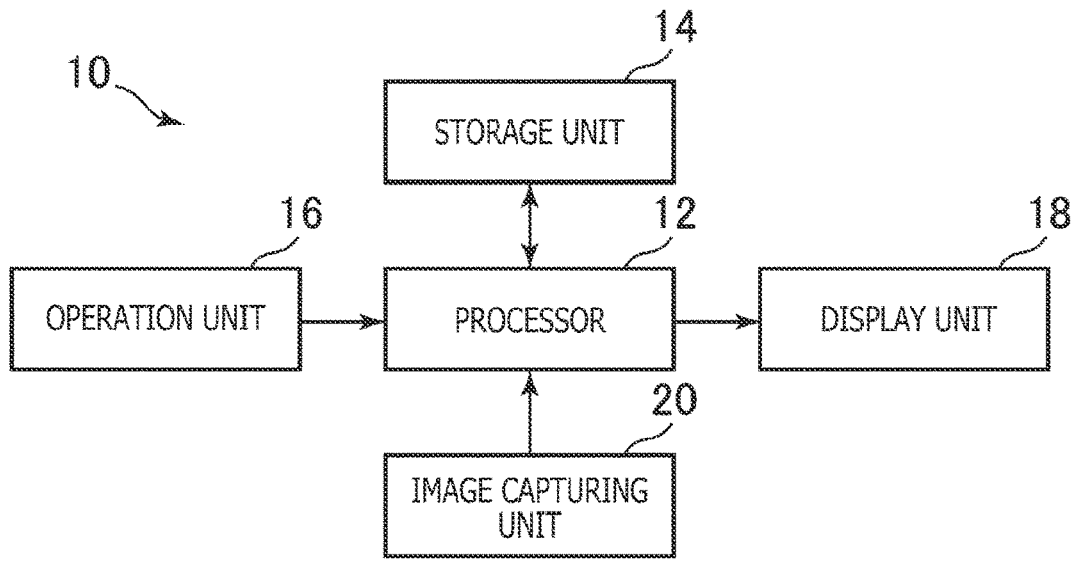
FIG. 1 is a view illustrating an example of a configuration of an information processing apparatus according to one embodiment of the present invention.

FIG. 1 is a view illustrating an example of a configuration of an information processing apparatus 10 according to one embodiment of the present invention. The information processing apparatus 10 according to the present embodiment is, for example, a computer such as a game console or a personal computer. As illustrated in FIG. 1, the information processing apparatus 10 according to the present embodiment includes, for example, a processor 12, a storage unit 14, an operation unit 16, a display unit 18, and an image capturing unit 20.

The processor 12 is, for example, a program control device such as a CPU (Central Processing Unit) that operates according to a program installed into the information processing apparatus 10.

The storage unit 14 is, for example, a storage element such as a ROM (Read-Only Memory) or a RAM (Random-Access Memory), or a solid-state drive. For example, a program to be executed by the processor 12 is stored in the storage unit 14.

The operation unit 16 is a user interface such as a keyboard, a mouse, or a controller for a game console, accepts an operation input from a user, and outputs a signal indicating details of the operation to the processor 12.

The display unit 18 is a display device such as a liquid crystal display and displays various images according to an instruction from the processor 12.

The image capturing unit 20 is an image capturing device such as a digital camera. The image capturing unit 20 according to the present embodiment is a video camera that can capture a moving image.

Note that the information processing apparatus 10 may include an audio input/output device such as a microphone or a speaker. In addition, the information processing apparatus 10 may include a communication interface such as a network board, an optical disc drive that reads an optical disk such as a DVD (Digital Versatile Disc)-ROM or a Blu-ray (registered trademark) disc, a USB (Universal Serial Bus) port, etc.

Figure 2:
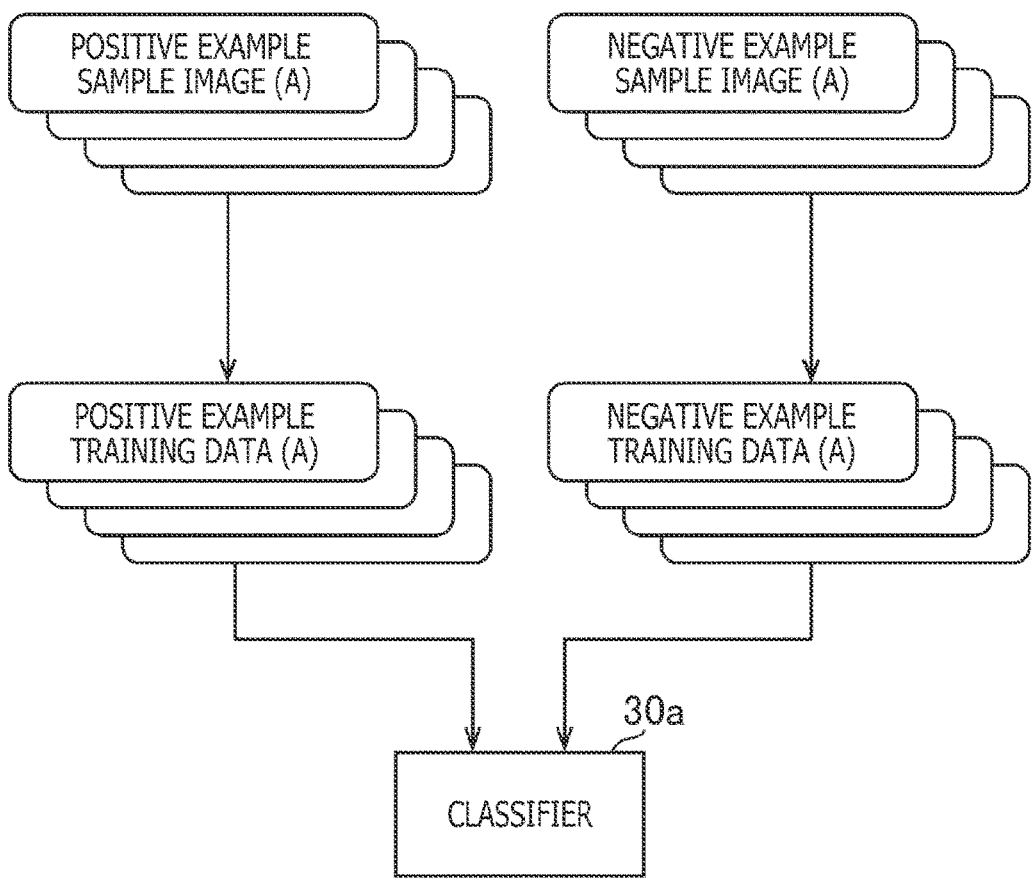
FIG. 2 is a view that illustrates an example of training a classifier in the one embodiment according to the present invention.

In the present embodiment, as illustrated in FIG. 2, a classifier 30a (a trained classifier 30a) such as an SVM (Support Vector Machine) which has been trained with a plurality of pieces of positive example training data (A) as positive examples and a plurality of pieces of negative example training data (A) as negative examples is generated. Each of the plurality of pieces of positive example training data (A) is, for example, generated on the basis of a sample image (hereinafter, referred to as a positive example sample image (A)) in which an object belonging to a positive class in the classifier 30a appears. In addition, each of the plurality of pieces of negative example training data (A) is, for example, generated on the basis of a sample image (hereinafter, referred to as a negative example sample image (A)) in which an object belonging to a negative class in the classifier 30a appears.

Figure 3:
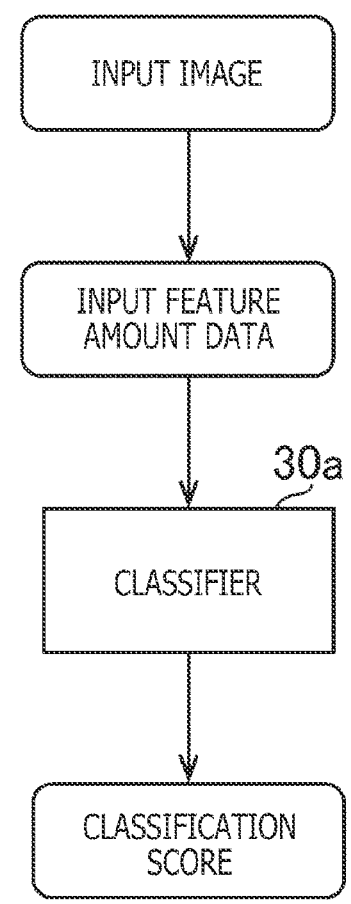
FIG. 3 is a view that illustrates an example of classification using the trained classifier in the one embodiment according to the present invention.

As illustrated in FIG. 3, according to input of feature amount data indicating a feature amount corresponding to an input image, the trained classifier 30a outputs a classification score indicating a probability that an object appearing in the input image belongs to a positive class in the classifier 30a.

Figure 4:
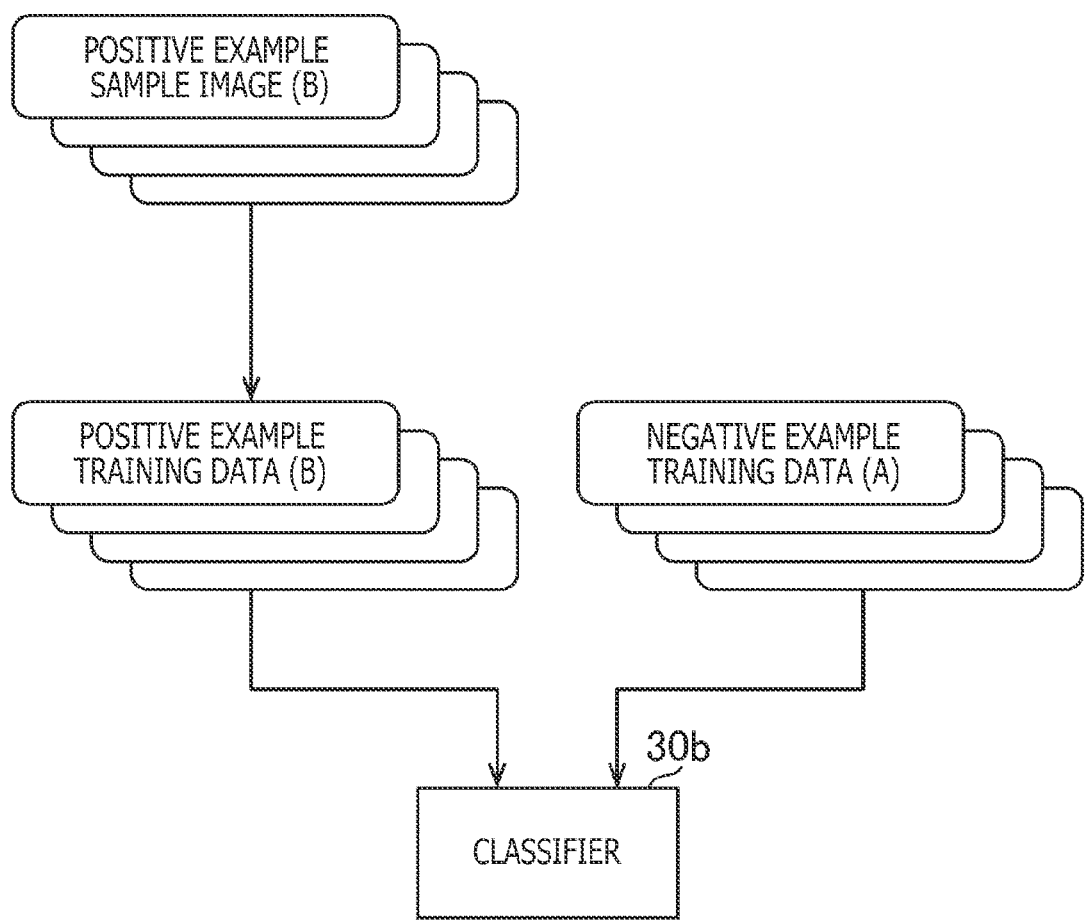
FIG. 4 is a view that illustrates an example of training a classifier in the one embodiment according to the present invention.

Subsequently, as illustrated in FIG. 4, in the present embodiment, for example, a classifier 30b (a trained classifier 30b) such as an SVM which has been trained with a plurality of pieces of positive example training data (B) as positive examples and with a plurality of pieces of negative example training data (A) as negative examples is generated.

Each of the plurality of pieces of positive example training data (B) is, for example, generated on the basis of a sample image (hereinafter, referred to as a positive example sample image (B)) in which an object belonging to a positive class in the classifier 30b appears. In the present embodiment, the negative example training data (A) used to train the classifier 30a is reused as a negative example for the classifier 30b.

Figure 5:
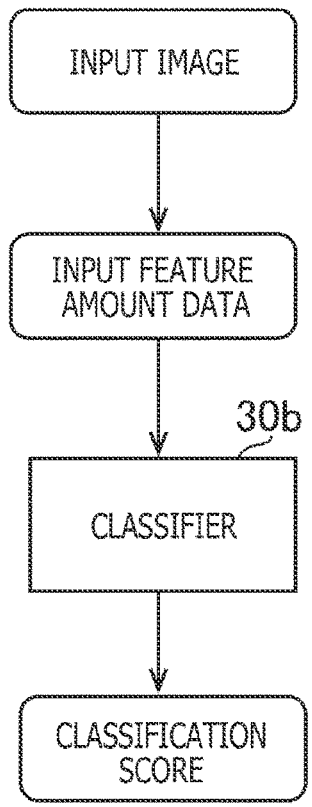
FIG. 5 is a view that illustrates an example of classification using the trained classifier in the one embodiment according to the present invention.

As illustrated in FIG. 5, according to input of feature amount data indicating a feature amount corresponding to an input image, the trained classifier 30b outputs a classification score indicating a probability that an object appearing in the input image belongs to a positive class in the classifier 30b.

For example, an RPN (Regional Proposal Network) that is trained in advance is stored in the information processing apparatus 10 according to the present embodiment. In the present embodiment, the RPN is used to extract, from a sample image, a region in which some kind of object is estimated to appear. By this process, it is possible to reduce wasteful calculations and ensure a certain level of robustness even with respect to an environment.

For example, a normalization process such as a process (mask process) for removing a background is executed on an image of the extracted region. By this process, it is possible to shrink a domain gap due to the background or an illumination condition, and, as a result, it becomes possible to complete training of the classifier 30 even with data collected under a limited environment.

In addition, a CNN (Convolutional Neural Network) for which metric training has been executed in advance is stored in the information processing apparatus 10 according to the present embodiment. According to input of an image, this CNN outputs feature amount data indicating a feature amount corresponding to the image. Through the prior metric training, this CNN is tuned to output feature amount data indicating a feature amount that is close to a feature amount of an image in which an object belonging to a positive class appears. A feature amount indicated by feature amount data according to the present embodiment is, for example, a vector quantity normalized such that a norm thereof is 1.

In the present embodiment, with the use of this CNN, feature amount data which indicates a feature amount corresponding to the image for which the normalization process has been executed is generated. By using the CNN for which prior metric training has been executed, feature amounts of a sample belonging to one class are aggregated in a compact region regardless of conditions. As a result, the information processing apparatus 10 according to the present embodiment becomes able to decide an appropriate classification boundary for the classifier 30 even from a small number of samples.

In the present embodiment, by inputting, to the CNN for which metric training has been executed, an image resulting from execution of a normalization process on an image of a region extracted from a positive example sample image (A) by using an RPN, feature amount data indicating a feature amount corresponding to the positive example sample image (A) is generated. The feature amount data generated from the positive example sample image (A) in such a manner corresponds to the positive example training data (A) illustrated in FIG. 2.

In the present embodiment, by inputting, to the CNN for which metric training has been executed, an image resulting from execution of a normalization process on an image of a region extracted from a positive example sample image (B) by using an RPN, feature amount data indicating a feature amount corresponding to the positive example sample image (B) is generated. The feature amount data generated from the positive example sample image (B) in such a manner corresponds to the positive example training data (B) illustrated in FIG. 4.

In addition, in the present embodiment, by inputting, to the CNN for which metric training has been executed, an image resulting from execution of a normalization process on an image of a region extracted from a negative example sample image (A) by using an RPN, feature amount data indicating a feature amount corresponding to the negative example sample image (A) is generated. The feature amount data generated from the negative example sample image (A) in such a manner corresponds to the negative example training data (A) illustrated in FIG. 2 and FIG. 4.

In the present embodiment, for an input image that is a target for estimation of an object appearing in the image, the above-described region extraction, normalization process, and generation of feature amount data using a CNN for which metric training has been executed are performed, and feature amount data corresponding to the input image is thus generated. By inputting the feature amount data generated in such a manner to the trained classifier 30a, the trained classifier 30a outputs a classification score that indicates a probability that an object appearing in the input image belongs to a positive class in the classifier 30a. In addition, by inputting the feature amount data generated in such a manner to the trained classifier 30b, the trained classifier 30b outputs a classification score that indicates a probability that an object appearing in the input image belongs to a positive class in the classifier 30b.

As described above, pieces of negative example training data (A) that have been used as negative examples for the classifier 30a cannot be reused as negative examples for the classifier 30b without any change, and therefore, it is necessary to exclude data that should be handled as a positive example in the classifier 30b, from these pieces of negative example training data (A).

Figure 6:
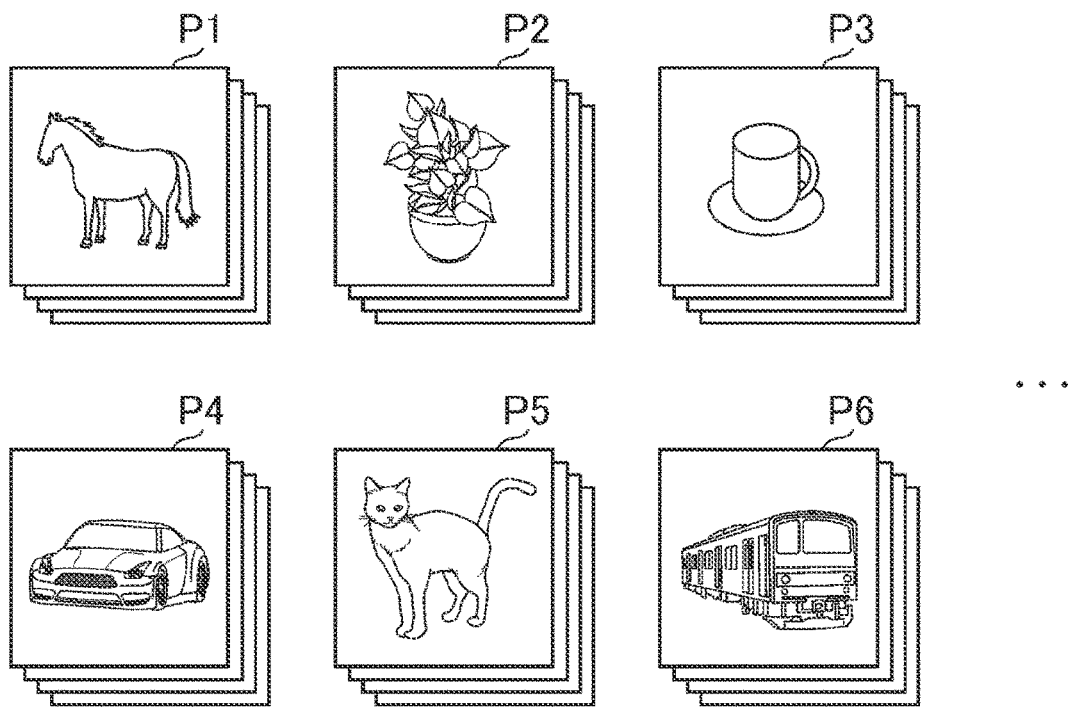
FIG. 6 is a view that illustrates an example of negative example sample images.

FIG. 6 schematically illustrates an example of a plurality of horse images P1, a plurality of plant images P2, a plurality of cup images P3, a plurality of car images P4, a plurality of cat images P5, and a plurality of train images P6, which are included in a plurality of negative example sample images (A). For example, it is assumed herein that pieces of negative example training data (A) generated on the basis of these images are used as negative examples for the classifier 30a that identifies whether or not there is a dog image. In this case, it is necessary to exclude negative example training data (A) based on the cat images P5 from negative examples for the classifier 30b that identifies whether or not there is a cat image. This is because the classification accuracy of the classifier 30b will worsen when the negative example training data (A) based on cat images is used as not only a positive example but also a negative example.

However, pieces of negative example training data (A) used as negative examples for the classifier 30a are associated with various items in a mixed state, and each of them does not always have a label indicating the associated item. Accordingly, it is difficult to extract data that needs to be excluded from this negative example training data (A).

In view of the fact described above, the present embodiment makes it possible to reuse the negative example training data (A) as negative examples for the classifier 30b in the following manner.

Functions implemented by the information processing apparatus 10 according to the present embodiment and processing executed by the information processing apparatus 10 according to the present embodiment will be described below.

Figure 7A:
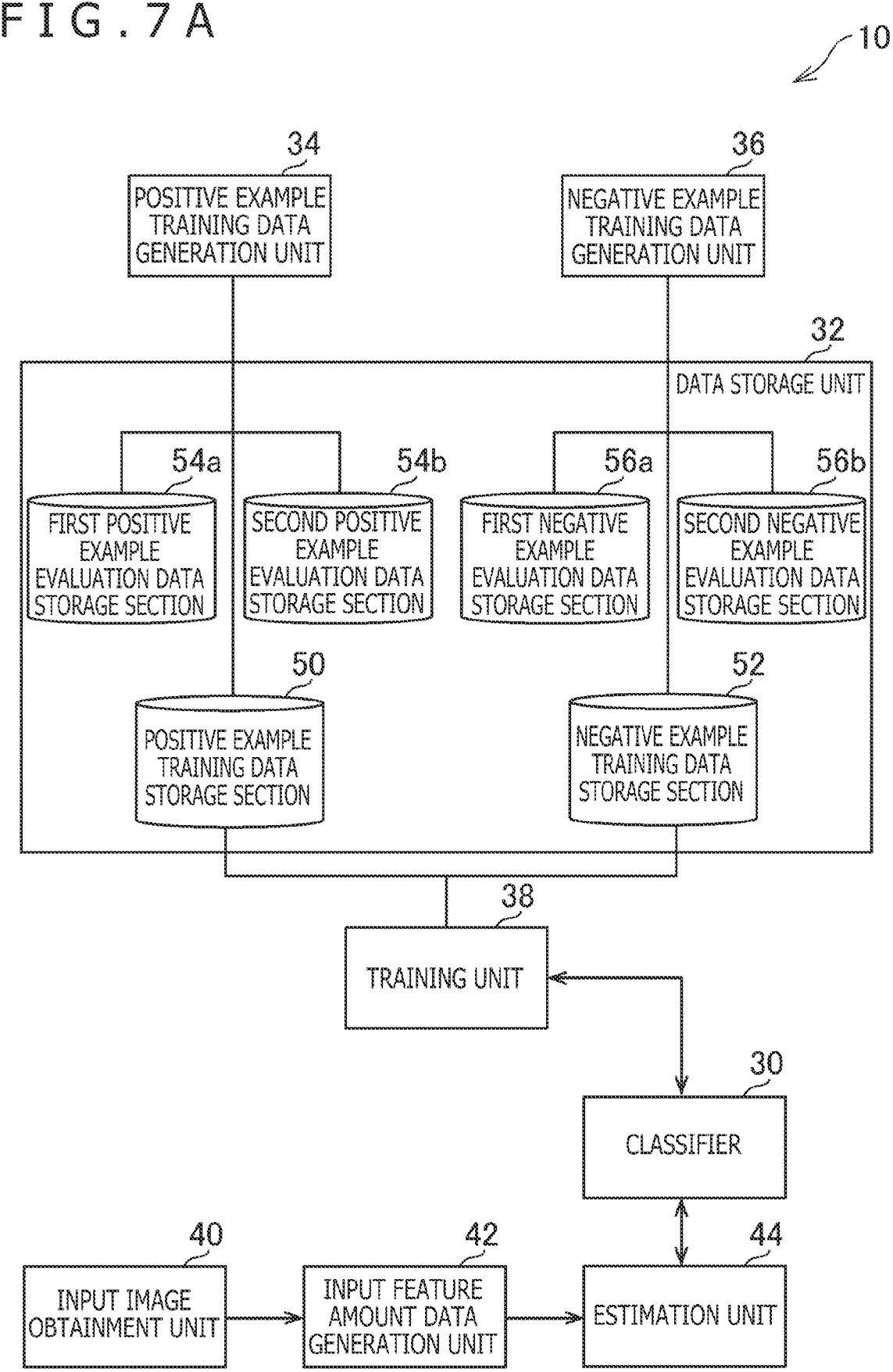
FIG. 7A is a functional block diagram that illustrates an example of functions implemented by the information processing apparatus according to the one embodiment of the present invention.
Figure 7B:
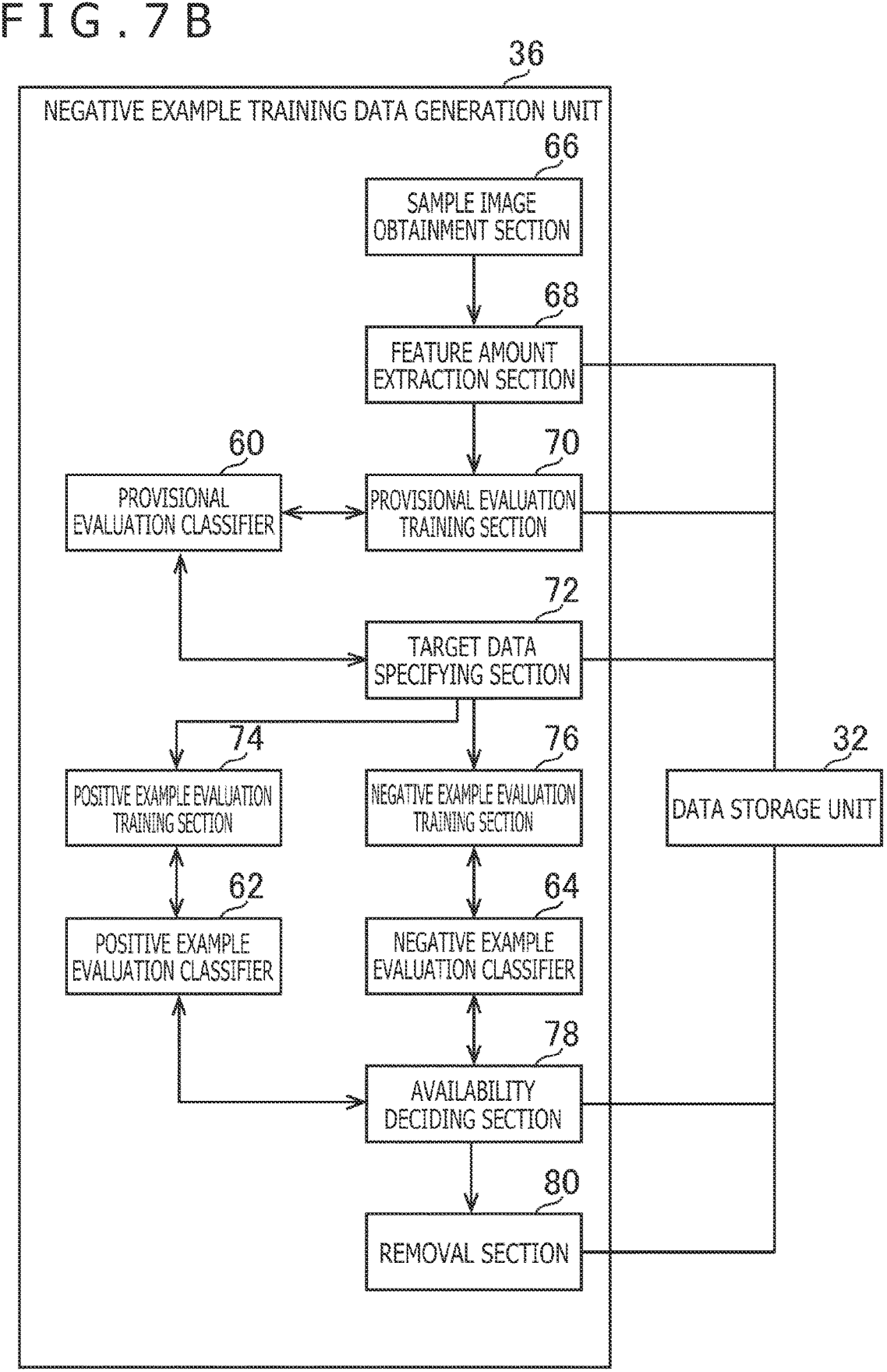
FIG. 7B is a functional block diagram that illustrates an example of functions implemented by the information processing apparatus according to the one embodiment of the present invention.
Figure 7C:
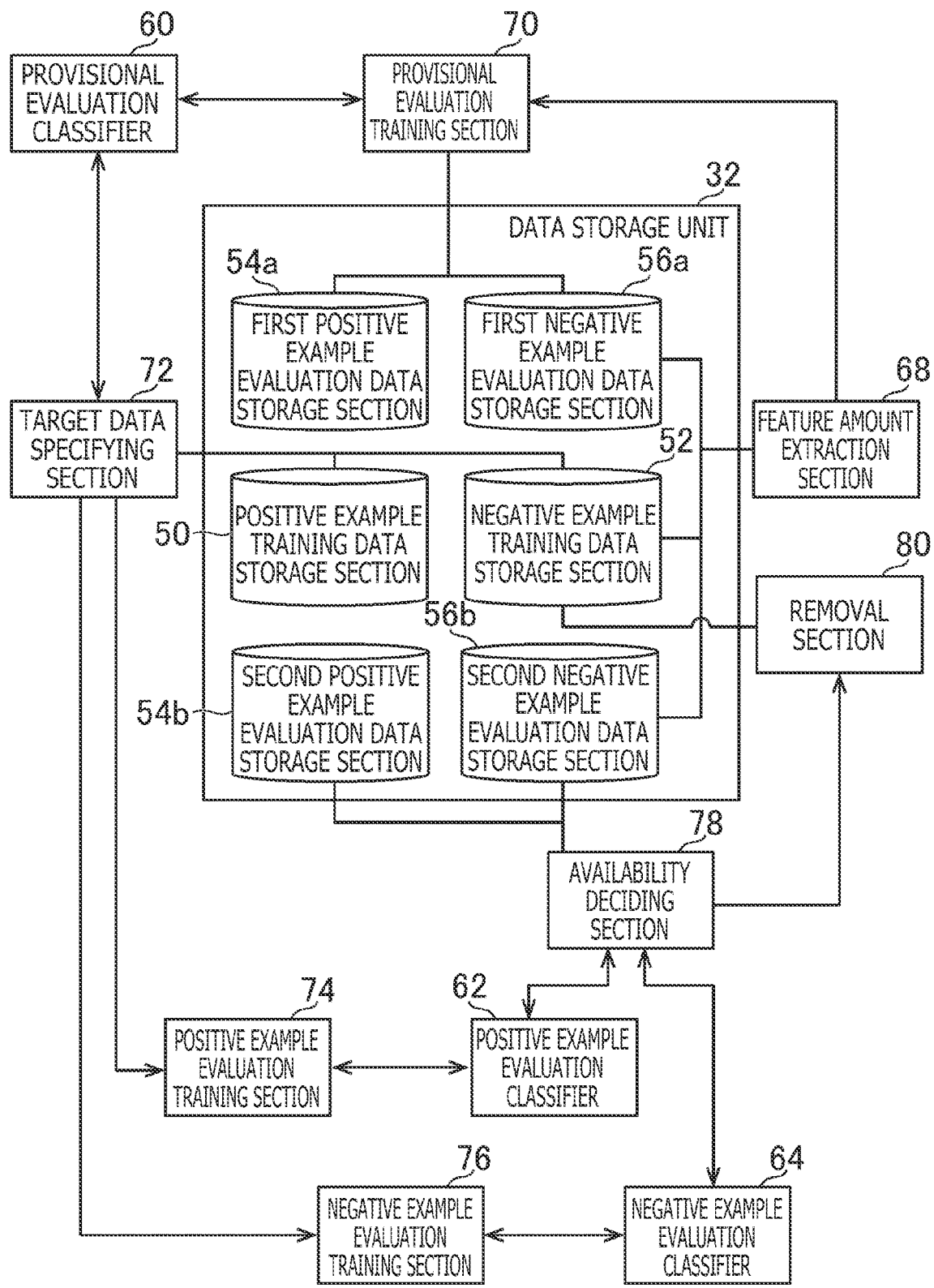
FIG. 7C is a functional block diagram that illustrates an example of functions implemented by the information processing apparatus according to the one embodiment of the present invention.

FIG. 7A, FIG. 7B, and FIG. 7C are functional block diagrams that illustrate an example of functions implemented by the information processing apparatus 10 according to the present embodiment. Note that, in the information processing apparatus 10 according to the present embodiment, all of the functions illustrated in FIG. 7A, FIG. 7B, and FIG. 7C do not necessarily need to be implemented, and functions other than the functions illustrated in FIG. 7A, FIG. 7B, and FIG. 7C may be implemented.

As illustrated in FIG. 7A, the information processing apparatus 10 according to the present embodiment functionally includes, for example, a classifier 30, a data storage unit 32, a positive example training data generation unit 34, a negative example training data generation unit 36, a training unit 38, an input image obtainment unit 40, an input feature amount data generation unit 42, and an estimation unit 44.

The data storage unit 32 includes a positive example training data storage section 50, a negative example training data storage section 52, a first positive example evaluation data storage section 54a, a second positive example evaluation data storage section 54b, a first negative example evaluation data storage section 56a, and a second negative example evaluation data storage section 56b.

FIG. 7B illustrates details of functions implemented by the negative example training data generation unit 36 illustrated in FIG. 7A. As illustrated in FIG. 7B, the negative example training data generation unit 36 functionally includes, for example, a provisional evaluation classifier 60, a positive example evaluation classifier 62, a negative example evaluation classifier 64, a sample image obtainment section 66, a feature amount extraction section 68, a provisional evaluation training section 70, a target data specifying section 72, a positive example evaluation training section 74, a negative example evaluation training section 76, an availability deciding section 78, and a removal section 80.

FIG. 7C illustrates relations among the respective constituent elements included in the data storage unit 32 and the feature amount extraction section 68, the provisional evaluation training section 70, the target data specifying section 72, the availability deciding section 78, and the removal section 80, which are illustrated in FIG. 7B.

The positive example training data storage section 50, the negative example training data storage section 52, the first positive example evaluation data storage section 54a, the second positive example evaluation data storage section 54b, the first negative example evaluation data storage section 56a, and the second negative example evaluation data storage section 56b are mainly implemented by the storage unit 14. The classifier 30, the provisional evaluation classifier 60, the positive example evaluation classifier 62, and the negative example evaluation classifier 64 are mainly implemented by the processor 12 and the storage unit 14. The positive example training data generation unit 34, the training unit 38, the input feature amount data generation unit 42, the estimation unit 44, the feature amount extraction section 68, the provisional evaluation training section 70, the target data specifying section 72, the positive example evaluation training section 74, the negative example evaluation training section 76, the availability deciding section 78, and the removal section 80 are mainly implemented by the processor 12. The input image obtainment unit 40 and the sample image obtainment section 66 are mainly implemented by the processor 12 and the image capturing unit 20.

In the present embodiment, for example, the classifier 30 is a machine learning model such as an SVM and corresponds to the classifier 30a illustrated in FIG. 2 and FIG. 3 or the classifier 30b illustrated in FIG. 4 and FIG. 5. The classifier 30 identifies whether or not an object appearing in an input image belongs to a positive class.

In the present embodiment, the positive example training data generation unit 34 generates, for example, the above-described positive example training data that is to be learned as a positive example by the classifier 30.

For example, for each of a plurality of positive example sample images captured by the image capturing unit 20, the positive example training data generation unit 34 generates positive example feature amount data which is feature amount data indicating a feature amount corresponding to the positive example sample image. An object belonging to a positive class appears in each of these positive example sample images. Here, positive example feature amount data corresponding to a positive example sample image may be generated by performing the above-described region extraction, normalization process, and generation of feature amount data using a CNN for which metric training has been executed.

Then, the positive example training data generation unit 34 stores part of this positive example feature amount data in the positive example training data storage section 50 as positive example training data. In addition, the positive example training data generation unit 34 stores part of the remainder of this positive example feature amount data in the first positive example evaluation data storage section 54a as first positive example evaluation data. Moreover, the positive example training data generation unit 34 stores the remaining positive example feature amount data in the second positive example evaluation data storage section 54b as second positive example evaluation data. Here, for example, one third of the positive example feature amount data may be stored in the positive example training data storage section 50 as positive example training data. Further, half of the remainder of the positive example feature amount data (one third of the whole) may be stored in the first positive example evaluation data storage section 54a as first positive example evaluation data. In addition, the remaining positive example feature amount data (one third of the whole) may be stored in the second positive example evaluation data storage section 54b as second positive example evaluation data.

In the present embodiment, the negative example training data generation unit 36 generates, for example, the above-described negative example training data that is to be used as a negative example for training the classifier 30.

In the present embodiment, for example, for each of a plurality of negative example sample images captured by the image capturing unit 20, negative example feature amount data which is feature amount data indicating a feature amount corresponding to the negative example sample image is generated. Here, negative example feature amount data corresponding to a negative example sample image may be generated by performing the above-described region extraction, normalization process, and generation of feature amount data using a CNN for which metric training has been executed.

Then, the negative example training data generation unit 36 stores part of this negative example feature amount data in the negative example training data storage section 52 as negative example training data. In addition, the negative example training data generation unit 36 stores part of the remainder of this negative example feature amount data in the first negative example evaluation data storage section 56a as first negative example evaluation data. Moreover, the negative example training data generation unit 36 stores the remaining negative example feature amount data in the second negative example evaluation data storage section 56b as second negative example evaluation data. Here, for example, one third of the negative example feature amount data may be stored in the negative example training data storage section 52 as negative example training data. Further, half of the remainder of the negative example feature amount data (one third of the whole) may be stored in the first negative example evaluation data storage section 56a as first negative example evaluation data. Also, the remaining negative example feature amount data (one third of the whole) may be stored in the second negative example evaluation data storage section 56*b* as second negative example evaluation data.

In the present embodiment, for example, the training unit 38 generates the classifier 30 (trained classifier 30) that is trained with the positive example training data, which is stored in the positive example training data storage section 50, as positive examples and with the negative example training data, which is stored in the negative example training data storage section 52, as negative examples.

In the present embodiment, for example, the input image obtainment unit 40 obtains an input image that is captured by the image capturing unit 20 and that is a target for estimation of an object appearing therein.

In the present embodiment, for example, the input feature amount data generation unit 42 generates input feature amount data indicating a feature amount corresponding to the input image, as described above.

In the present embodiment, for example, the estimation unit 44 inputs the input feature amount data to the classifier 30 to thereby estimate whether or not an object appearing in the input image belongs to a positive class. Here, for example, the estimation unit 44 may specify a value of a classification score to be outputted from the classifier 30 according to the input of input feature amount data.

In the present embodiment, for example, the capturing and obtaining of an input image, the generation of input feature amount data, and the estimation of whether or not an object appearing in the input image belongs to a positive class are repeatedly executed at a predetermined frame rate. In such a manner, in the present embodiment, for each frame, whether or not an object appearing in an input image captured in the frame belongs to a positive class is estimated. Accordingly, according to the present embodiment, it is possible to perform high-speed object detection. In addition, according to the present embodiment, it becomes possible to train the classifier 30 by using a small amount of data prepared by a user, and there is no necessity to prepare a large amount of labeled data in order to train the classifier 30 as with a conventional technique.

In the present embodiment, for example, when training of the classifier 30*a* is executed, positive example feature amount data generated on the basis of the positive example sample image (A) by the positive example training data generation unit 34 is referred to as positive example feature amount data (A). In this case, the positive example feature amount data (A) is classified as positive example training data (A), first positive example evaluation data (A), or second positive example evaluation data (A). The positive example training data (A), the first positive example evaluation data (A), and the second positive example evaluation data (A) are respectively stored in the positive example training data storage section 50, the first positive example evaluation data storage section 54*a*, and the second positive example evaluation data storage section 54*b*.

In the present embodiment, for example, when training of the classifier 30*a* is executed, negative example feature amount data generated on the basis of a negative example sample image (A) by the negative example training data generation unit 36 is referred to as negative example feature amount data (A). In this case, the negative example feature amount data (A) is classified as any one of negative example training data (A), first negative example evaluation data (A), and second negative example evaluation data (A). The positive example training data (A), the first negative example evaluation data (A), and the second negative example evaluation data (A) are respectively stored in the negative example training data storage section 52, the first negative example evaluation data storage section 56*a*, and the second negative example evaluation data storage section 56*b*.

As described above, the training unit 38 generates the classifier 30*a* (trained classifier 30*a*) that is trained with the positive example training data (A), which is stored in the positive example training data storage section 50, as positive examples and with the negative example training data (A), which is stored in the negative example training data storage section 52, as negative examples.

Subsequently, when training of the classifier 30*b* is executed, positive example feature amount data generated on the basis of a positive example sample image (B) by the positive example training data generation unit 34 is referred to as positive example feature amount data (B). In this case, the positive example feature amount data (B) is classified as any one of positive example training data (B), first positive example evaluation data (B), and second positive example evaluation data (B). The positive example training data (B), the first positive example evaluation data (B), and the second positive example evaluation data (B) are respectively stored in the positive example training data storage section 50, the first positive example evaluation data storage section 54*a*, and the second positive example evaluation data storage section 54*b*.

The above-described negative example training data (A), first negative example evaluation data (A), and second negative example evaluation data (A) are respectively stored in the negative example training data storage section 52, the first negative example evaluation data storage section 56*a*, and the second negative example evaluation data storage section 56*b*.

Here, by processing to be described below, part of the negative example training data (A) stored in the negative example training data storage section 52 is removed.

As described above, the training unit 38 generates the classifier 30*b* (trained classifier 30*b*) that is trained with the positive example training data (B), which is stored in the positive example training data storage section 50, as positive examples and with the remaining negative example training data (A) that has not been removed from the negative example training data storage section 52, as negative examples.

Description is further given below regarding functions of the negative example training data generation unit 36, focusing on removal of negative example training data (A) described above. As described above, the negative example training data generation unit 36 functionally includes, for example, the provisional evaluation classifier 60, the positive example evaluation classifier 62, the negative example evaluation classifier 64, the sample image obtainment section 66, the feature amount extraction section 68, the provisional evaluation training section 70, the target data specifying section 72, the positive example evaluation training section 74, the negative example evaluation training section 76, the availability deciding section 78, and the removal section 80.

In the present embodiment, for example, the provisional evaluation classifier 60, the positive example evaluation classifier 62, and the negative example evaluation classifier 64 are each a machine learning model such as a SVM that is used to decide negative example training data (A) that should be removed.

In the present embodiment, for example, the sample image obtainment section 66 repeatedly obtains a sample image which is an image resulting from capturing of an image of a sample. For example, the sample image obtainment section 66 repeatedly obtains a negative example sample image (A) in which an object belonging to a negative class in the classifier 30a appears. For example, a user uses the image capturing unit 20 to capture a sample from various angles while moving the image capturing unit 20, and a moving image is thus captured.

In the present embodiment, for example, the feature amount extraction section 68 generates, on the basis of a sample image, feature amount data indicating a feature amount corresponding to the sample image. Here, feature amount data corresponding to a sample image may be generated by performing, on the sample image, the above-described region extraction, normalization process, and generation of feature amount data using a CNN for which metric training has been executed.

For example, the feature amount extraction section 68 generates, on the basis of a negative example sample image (A), negative example feature amount data (A) that indicates a feature amount corresponding to the negative example sample image. The negative example feature amount data (A) is classified as any one of negative example training data (A), first negative example evaluation data (A), and second negative example evaluation data (A). The feature amount extraction section 68 stores the negative example training data (A) in the negative example training data storage section 52, stores the first negative example evaluation data (A) in the first negative example evaluation data storage section 56a, and stores the second negative example evaluation data (A) in the second negative example evaluation data storage section 56b.

In the present embodiment, for example, the provisional evaluation training section 70 generates the provisional evaluation classifier 60 (trained provisional evaluation classifier 60) which has been trained with the first positive example evaluation data (B) as positive examples and with the first negative example evaluation data (A) as negative examples.

In the present embodiment, for example, for each of a plurality of pieces of negative example training data (A), the target data specifying section 72 specifies a classification score that is outputted from the provisional evaluation classifier 60 when the negative example training data (A) is inputted to the provisional evaluation classifier 60 for which the training has been executed as described above. From among the plurality of pieces of negative example training data (A), target data is specified on the basis of values of specified classification scores. For example, negative example training data (A) having a value of the specified classification score greater than a predetermined value is specified as the target data.

In the present embodiment, for example, the positive example evaluation training section 74 generates the positive example evaluation classifier 62 (trained positive example evaluation classifier 62) that is trained with the target data as a positive example. Here, the positive example evaluation training section 74 may generate the positive example evaluation classifier 62 which is trained with, as positive examples, target data specified from a plurality of pieces of negative example training data (A) by the target data specifying section 72 as described above. In addition, the positive example evaluation training section 74 may generate the positive example evaluation classifier 62 which is trained with the target data and the first positive example evaluation data (B) as positive examples and with the first negative example evaluation data (A) as negative examples.

In the present embodiment, for example, the negative example evaluation training section 76 generates negative example evaluation classifier 64 (trained negative example evaluation classifier 64) that is trained with target data as negative examples. For example, the negative example evaluation training section 76 may generate the negative example evaluation classifier 64 which is trained with, as negative examples, target data specified from a plurality of pieces of negative example training data (A) by the target data specifying section 72 as described above. In addition, the negative example evaluation training section 76 may generate the negative example evaluation classifier 64 which is trained with the first positive example evaluation data (B) as positive examples and with the target data as well as the first negative example evaluation data (A) as negative examples.

In the present embodiment, for example, the availability deciding section 78 uses given evaluation data to determine the classification accuracy of the positive example evaluation classifier 62 and the classification accuracy of the negative example evaluation classifier 64. Then, in the present embodiment, for example, on the basis of the determined classification accuracy of the positive example evaluation classifier 62 and the determined classification accuracy of the negative example evaluation classifier 64, the availability deciding section 78 decides whether or not to use target data as negative example training data (A) for training the classifier 30b. The details of processing for deciding whether or not to use target data as negative example training data (A) for training the classifier 30b will be described later.

In the present embodiment, for example, the removal section 80 removes, from the negative example training data storage section 52, target data that has been decided by the availability deciding section 78 not to be used as negative example training data (A) for training the classifier 30b.

The training unit 38 generates the classifier 30b that is trained with the positive example training data (B), which is stored in the positive example training data storage section 50, as positive examples and with the remaining negative example training data (A) that is not removed from the negative example training data storage section 52 in such a manner, as negative examples.

Figure 8:
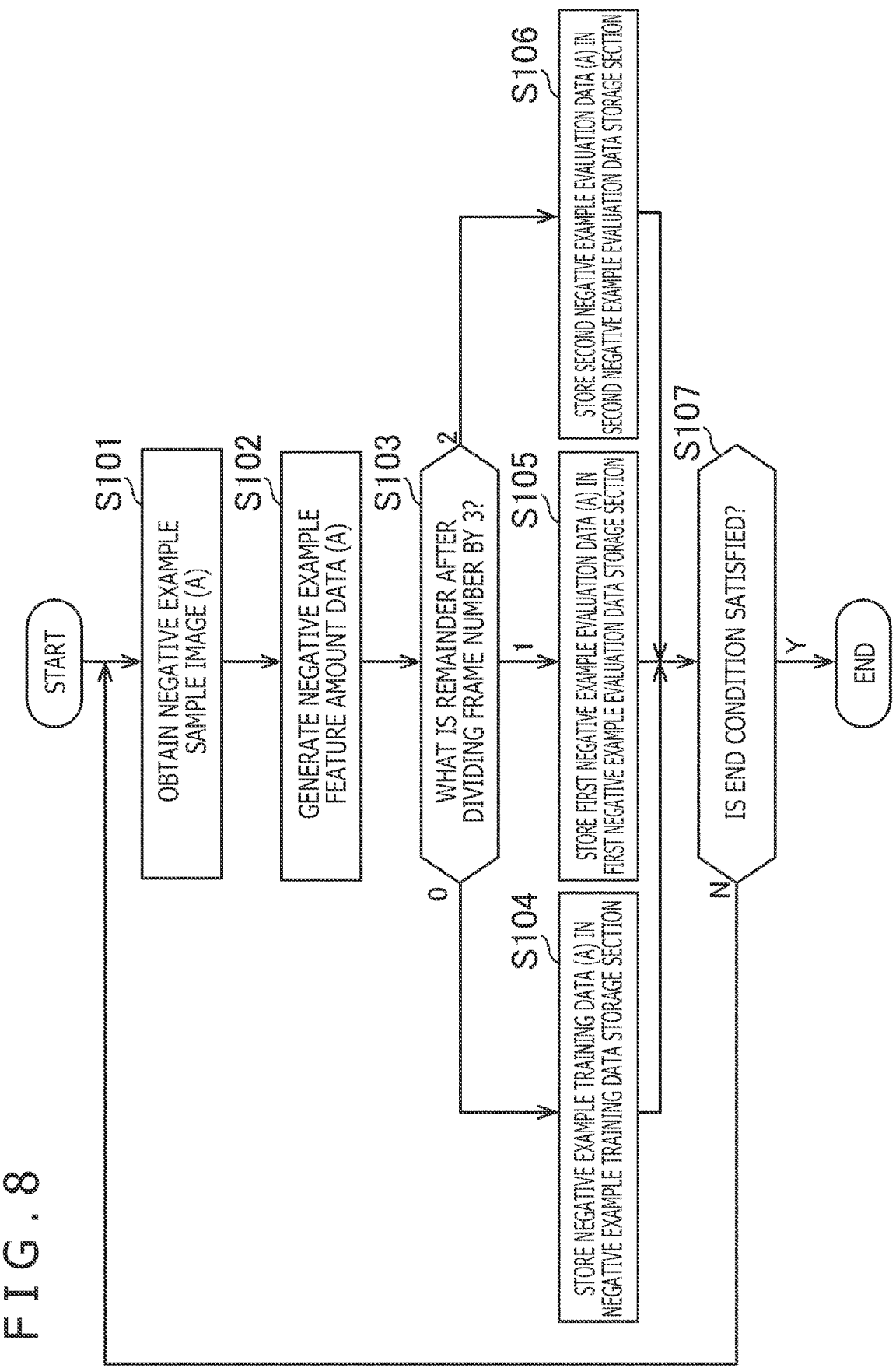
FIG. 8 is a flow chart illustrating an example of a flow of processing performed in the information processing apparatus according to the one embodiment of the present invention.

Here, with reference to a flow chart illustrated in FIG. 8, a flow of processing for generating negative example training data (A), first negative example evaluation data (A), and second negative example evaluation data (A), which is executed in the information processing apparatus 10 according to the present embodiment, will be described below by way of example. Note that, in the example of processing described below, it is assumed that a user uses the image capturing unit 20 to capture a sample of an object belonging to a negative class in the classifier 30a from various angles while moving the image capturing unit 20, to thereby capture a moving image. Further, it is assumed that the image capturing unit 20 generates, at a predetermined frame rate, a frame image obtained by capturing the sample. The user needs to capture the sample carefully such that an object belonging to a positive class in the classifier 30a does not appear in the captured image.

Firstly, the sample image obtainment section 66 obtains a negative example sample image (A) which is the latest image obtained by capturing a sample of an object belonging to a negative class in the classifier 30a with the use of the image capturing unit 20 (S101).

Then, on the basis of the negative example sample image (A) obtained in the processing of S101, the feature amount extraction section 68 generates negative example feature amount data (A) that indicates a feature amount corresponding to the negative example sample image (A) (S102).

The feature amount extraction section 68 then checks a remainder after dividing, by three, a frame number of the negative example sample image (A) obtained in the processing of S101 (S103).

In a case where the frame number is divided by three and the remainder is zero, the negative example feature amount data (A) generated in the processing of S102 is stored in the negative example training data storage section 52 as negative example training data (A) (S104).

In a case where the frame number is divided by three and the remainder is one, the negative example feature amount data (A) generated in the processing of S102 is stored in the first negative example evaluation data storage section 56a as first negative example evaluation data (A) (S105).

In a case where the frame number is divided by three and the remainder is two, the negative example feature amount data (A) generated in the processing of S102 is stored in the second negative example evaluation data storage section 56b as second negative example evaluation data (A) (S106).

Then, the feature amount extraction section 68 checks whether or not a predetermined end condition (for example, a predetermined number of pieces of negative example training data (A), first negative example evaluation data (A), and second negative example evaluation data (A) have been collected, etc.) is satisfied (S107).

In a case where the predetermined end condition is not satisfied (S107: N), the flow returns to the processing of S101.

In a case where the predetermined end condition is satisfied (S107: Y), the processing described in the present example is ended.

In the present embodiment, for example, the processing of S101 through S107 may be executed for various objects belonging to a negative class in the classifier 30a. Consequently, negative example training data (A), first negative example evaluation data (A), and second negative example evaluation data (A) regarding various objects are accumulated.

In addition, the method is not limited to the one described above. The processing of S101 through S107 described above may be executed on the basis of negative example sample images (A) collected by another method, such as images collected on the Web. With this, negative example training data (A), first negative example evaluation data (A), and second negative example evaluation data (A) may be accumulated.

Figure 9:
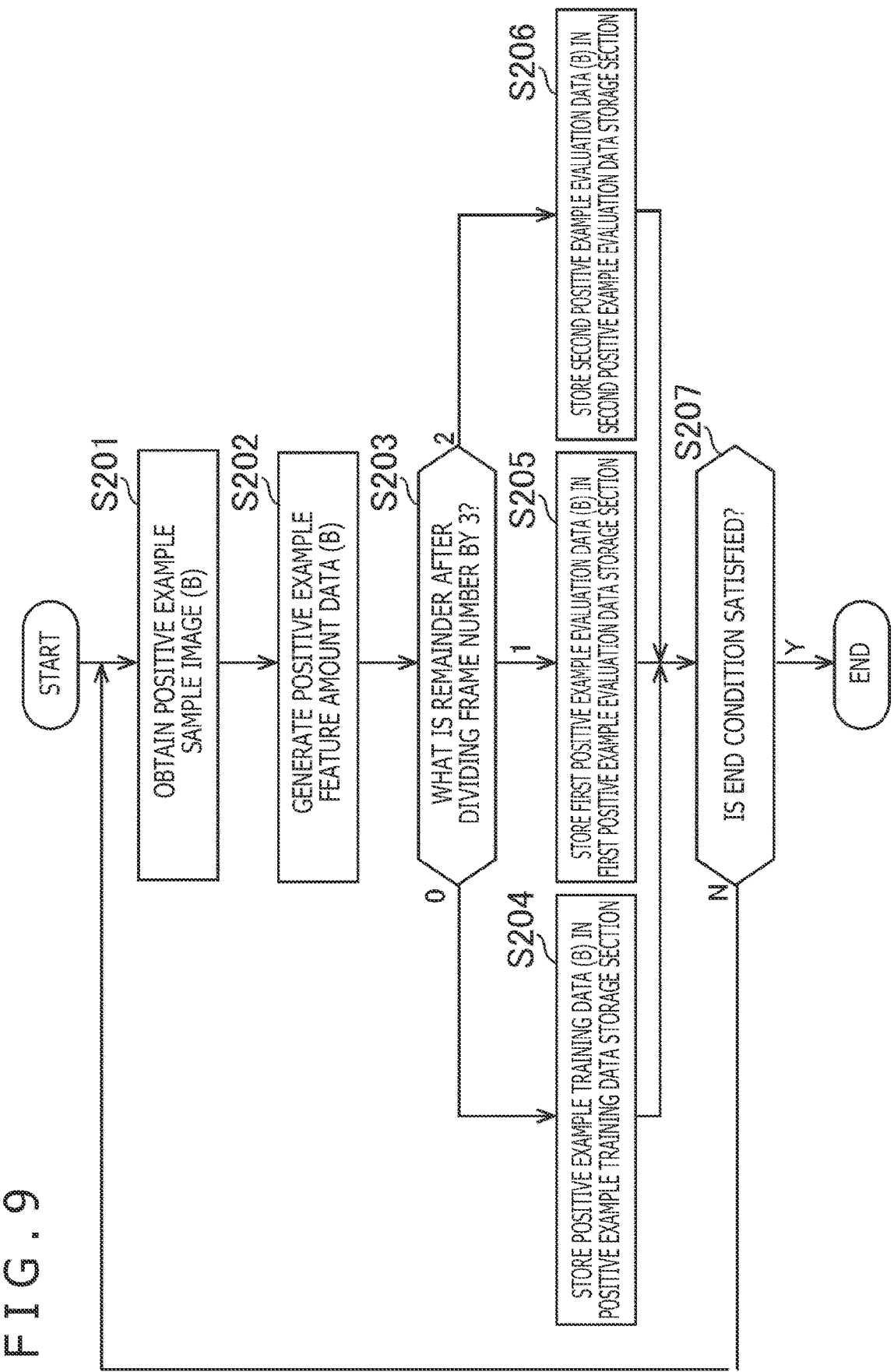
FIG. 9 is a flow chart illustrating an example of a flow of processing performed in the information processing apparatus according to the one embodiment of the present invention.

Next, with reference to a flow chart illustrated in FIG. 9, a flow of processing for generating positive example training data (B), first positive example evaluation data (B), and second negative example evaluation data B, which is executed in the information processing apparatus 10 according to the present embodiment, will be described below by way of example. Note that, in the example of processing described below, it is assumed that a user uses the image capturing unit 20 to capture a sample of an object belonging to a positive class in the classifier 30b from various angles while moving the image capturing unit 20, to thereby capture a moving image. Further, it is assumed that the image capturing unit 20 generates, at a predetermined frame rate, a frame image obtained by capturing the sample.

Firstly, the positive example training data generation unit 34 obtains a positive example sample image (B) which is the latest image obtained by capturing a sample of an object belonging to a positive class in the classifier 30b with the use of the image capturing unit 20 (S201).

Then, on the basis of the positive example sample image (B) obtained in the processing of S201, the positive example training data generation unit 34 generates positive example feature amount data (B) that indicates a feature amount corresponding to the positive example sample image (B) (S202).

The positive example training data generation unit 34 then checks a remainder after dividing, by three, a frame number of the positive example sample image (B) obtained in the processing of S201 (S203).

In a case where the frame number is divided by three and the remainder is zero, the positive example feature amount data (B) generated in the processing of S202 is stored in the positive example training data storage section 50 as positive example training data (B) (S204).

In a case where the frame number is divided by three and the remainder is one, the positive example feature amount data (B) generated in the processing of S202 is stored in the first negative example evaluation data storage section 56a as first positive example evaluation data (B) (S205).

In a case where the frame number is divided by three and the remainder is two, the positive example feature amount data (B) generated in the processing of S202 is stored in the second positive example evaluation data storage section 54b as second positive example evaluation data (B) (S206).

The positive example training data generation unit 34 checks whether or not a predetermined end condition (for example, a predetermined number of pieces of positive example training data (B), second positive example evaluation data (B), and second positive example evaluation data (B) are collected, etc.) is satisfied (S207).

In a case where the predetermined end condition is not satisfied (S207: N), the flow returns the processing of S101.

In a case where the predetermined end condition is satisfied (S207: Y), the processing described in the present example is ended.

By performing processing similar to the processing of S201 through S207, positive example training data (A), first positive example evaluation data (A), and second positive example evaluation data (A) may be collected on the basis of a moving image obtained by capturing a sample of an object belonging to a positive class in the classifier 30a.

Thereafter, training of the classifier 30a using the positive example training data (A) and the negative example training data (A) may be executed.

Figure 10A:
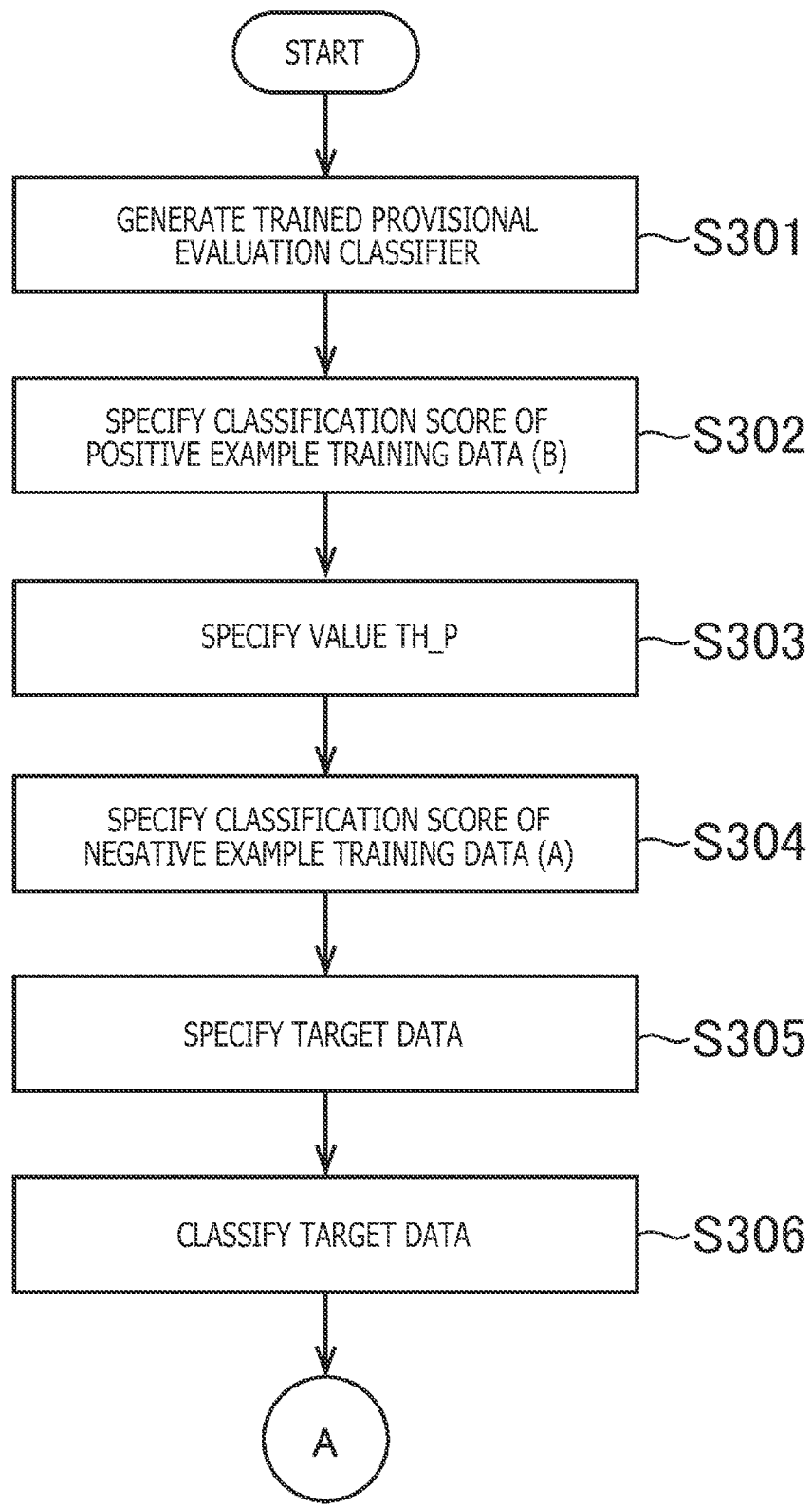
FIG. 10A is a flow chart illustrating an example of a flow of processing performed in the information processing apparatus according to the one embodiment of the present invention.
Figure 10B:
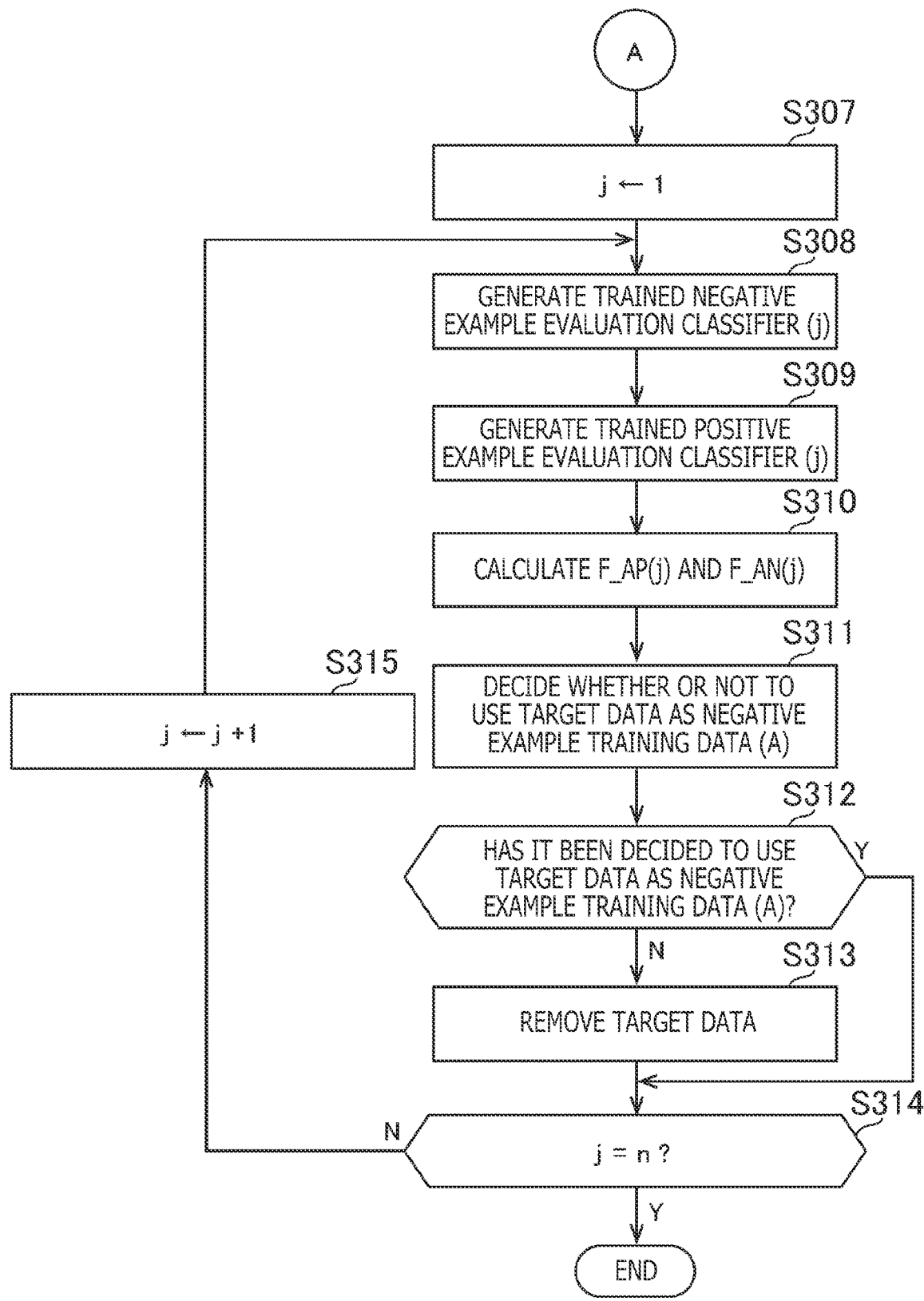
FIG. 10B is a flow chart illustrating an example of a flow of processing performed in the information processing apparatus according to the one embodiment of the present invention.

Next, with reference to flow charts illustrated in FIG. 10A and FIG. 10B, a flow of processing for removing positive example training data (A), which is executed in the information processing apparatus 10 according to the present embodiment, will be described below by way of example. It is assumed that a plurality of pieces of positive example training data (B) are stored in the positive example training data storage section 50 at the time when the processing described in the present example starts. In addition, it is assumed that a plurality of pieces of first positive example evaluation data (B) are stored in the first positive example evaluation data storage section 54a. Further, it is assumed that a plurality of pieces of second positive example evaluation data (B) are stored in the second positive example evaluation data storage section 54b. Also, it is assumed that a plurality of negative example training data (A) are stored in the negative example training data storage section 52. Moreover, it is assumed that a plurality of pieces of first negative example evaluation data (A) are stored in the first negative example evaluation data storage section 56a. Furthermore, it is assumed that a plurality of pieces of second negative example evaluation data (A) are stored in the second positive example evaluation data storage section 54b.

Firstly, the provisional evaluation training section 70 generates the provisional evaluation classifier 60 that is trained with the first positive example evaluation data (B), which is stored in the first positive example evaluation data storage section 54a, as positive examples and with the first negative example evaluation data (A), which is stored in the first negative example evaluation data storage section 56a, as negative examples (S301).

Then, the target data specifying section 72 uses the trained provisional evaluation classifier 60 generated in the processing of S301, to specify a classification score for each of the plurality of pieces of positive example training data (B) stored in the positive example training data storage section 50 (S302). Here, for example, a classification score outputted from the trained provisional evaluation classifier 60 when the positive example training data (B) is inputted to the provisional evaluation classifier 60 is specified.

The classification scores of the plurality of pieces of positive example training data (B) specified in the processing of S302 are sorted in ascending order, and the target data specifying section 72 then specifies a value TH_P from the classification scores in the top 10% (S303).

Then, the target data specifying section 72 uses the trained provisional evaluation classifier 60 generated in the processing of S301, to specify a classification score for each of the plurality of pieces of negative example training data (A) stored in the negative example training data storage section 52 (S304). Here, for example, a classification score outputted from the trained provisional evaluation classifier 60 when the negative example training data (A) is inputted to the provisional evaluation classifier 60 is specified.

The target data specifying section 72 subsequently specifies target data from the plurality of pieces of negative example training data (A) (S305). Here, the target data specifying section 72 may use the positive example training data (B), which is used to train the classifier 30b as positive examples, and the provisional evaluation classifier 60 to specify target data from the negative example training data (A). In the processing of S305, for example, from among the plurality of pieces of negative example training data (A), the target data specifying section 72 specifies, as target data, data whose classification score specified in the processing of S304 is greater than the value TH_P specified in the processing of S303. Here, it is assumed that a plurality of pieces of target data are specified.

Then, the target data specifying section 72 uses, for example, a clustering technique, etc., to classify the plurality of pieces of target data specified in S305 into target data groups (S306). When a distance between feature amounts indicated by pieces of target data is equal to or less than a predetermined value e, these pieces of target data are joined together in the target data group. Here, for example, it is assumed that pieces of target data are classified into n target data groups (T_HN(1) through T_HN(n)).

The availability deciding section 78 then sets a value of a variable j to one (S307).

Then, the negative example evaluation training section 76 generates a negative example evaluation classifier 64(j) that is trained with the first positive example evaluation data (B) as positive examples and with the first negative example evaluation data (A) and the plurality of pieces of target data included in the target data group T_HN(j) as negative examples (S308).

The positive example evaluation training section 74 subsequently generates a positive example evaluation classifier 62(j) that is trained with the first positive example evaluation data (B) and the plurality of pieces of target data included in the target data group T_HN(j) as positive examples and with the first negative example evaluation data (A) as negative examples (S309).

Then, the availability deciding section 78 calculates an F value (F_AP(j)) of the positive example evaluation classifier 62(j) and a F value (F_AN(j)) of the negative example evaluation classifier 64(j) (S310).

In the processing of S310, for example, for each of the plurality of pieces of second positive example evaluation data (B) stored in the second positive example evaluation data storage section 54b, a classification score which is outputted when the second positive example evaluation data (B) is inputted to the trained positive example evaluation classifier 62(j) generated in the processing of S309 is specified. The number TP_P(j) of those having the specified classification score equal to or greater than a predetermined value and the number FP_P(j) of those having the specified classification score less than the predetermined value are specified.

Then, for each of the plurality of pieces of second positive example evaluation data (B) described above, a classification score which is outputted when the second positive example evaluation data (B) is inputted to the trained negative example evaluation classifier 64(j) generated in the processing of S308 is specified. The number TP_N(j) of those having the specified classification score equal to or greater than a predetermined value and the number FP_N(j) of those having the specified classification score less than the predetermined value are specified.

In addition, for each of the plurality of pieces of second negative example evaluation data (A) stored in the second negative example evaluation data storage section 56b, a classification score which is outputted when the second negative example evaluation data is inputted to the trained positive example evaluation classifier 62 generated in the processing of S309 is specified. The number TN_P(j) of those having the specified classification score less than a predetermined value and the number FN_P(j) of those having the specified classification score equal to or greater than the predetermined value are specified.

Then, for each of the plurality of pieces of second negative example evaluation data (A) described above, a classification score which is outputted when the second negative example evaluation data is inputted to the trained negative example evaluation classifier 64(j) generated in the processing of S308 is specified. The number TN N(j) of those having the specified classification score less than a predetermined value and the number FN_N(j) of those having the specified classification score equal to or greater than the predetermined value are specified.

Then, a value of TP_P(j)/(TP_P(j)+FP_P(j)) is calculated as precision for the positive example evaluation classifier 62, and a value of TP_P(j)/(TP_P(j)+FN_P(j)) is calculated as recall for the positive example evaluation classifier 62(j). Further, a value of (2×precision×recall)/(precision+recall) is calculated as a value F_AP(j) which is an F value of the positive example evaluation classifier 62(j).

Similarly, a value of TP_N(j)/(TP_N(j)+FP_N(j)) is calculated as precision for the negative example evaluation classifier 64(j), and a value of TP_N(j)/(TP_N(j)+FN_N(j)) is calculated as recall for the negative example evaluation classifier 64(j). A value of (2×precision recall)/(precision+ recall) is calculated as a value $F\_AN(j)$ which is an F value of the negative example evaluation classifier 64(*j*).

Then, on the basis of the value of $F\_AP(j)$ and the value of $F\_AN(j)$, the availability deciding section 78 decides whether or not to use the plurality of pieces of target data included in the target data group $T\_HN(j)$, as negative example training data (A) for training the classifier 30*b* (S311).

Here, for example, in a case where a predetermined threshold is TH and where a condition $F\_AP(j)>F\_AN(j)+TH$ is satisfied, the availability deciding section 78 decides not to use the above-described target data as negative example training data (A) for training the classifier 30*b*. In contrast, in a case where the condition $F\_AP>F\_AN+TH$ is not satisfied, the availability deciding section 78 decides to use the above-described target data as negative example training data (A) for training the classifier 30*b*.

The removal section 80 checks whether or not it has been decided in the processing of S311 to use the plurality of pieces of target data included in the target data group $T\_HN(j)$ as negative example training data (A) for training the classifier 30*b* (S312).

It is assumed that it has been decided in the processing of S311 not to use the plurality of pieces of target data included in the target data group $T\_HN(j)$ as negative example training data (A) for training the classifier 30*b* (S312: N). In this case, the removal section 80 removes the plurality of pieces of target data included in the target data group $T\_HN(j)$ from the negative example training data storage section 52 (S313).

The availability deciding section 78 checks whether or not the value of the variable j is n (S314). It is assumed that it has been decided in the processing of S311 to use the plurality of pieces of target data included in the target data group $T\_HN(j)$ as negative example training data (A) for training the classifier 30*b* (S312: Y). In this case, the availability deciding section 78 also checks whether or not the value of the variable j is n (S314).

In a case where the value of the variable j is not n (S314: N), the availability deciding section 78 increments the value of the variable j by 1 (S315), and the flow returns to the processing of S308.

In a case where the value of the variable j is n (S314: Y), the processing described in the present example is ended.

In the processing of S307 through S315 in the present example, for each of the plurality of target data groups ($T\_HN(1)$ through $T\_HN(n)$), the positive example evaluation training section 74 generates a positive example evaluation classifier 62 (positive example evaluation classifier 62(1) through positive example evaluation classifier 62(*n*)) that is trained with the plurality of pieces of target data included in the corresponding target data group as positive examples and that is associated with the target data group.

In addition, for each of the plurality of target data groups ($T\_HN(1)$ through $T\_HN(n)$), the negative example evaluation training section 76 generates a negative example evaluation classifier 64 (negative example evaluation classifier 64(1) through (negative example evaluation classifier 64(*n*)) that is trained with the plurality of pieces of target data included in the corresponding target data group as negative examples and that is associated with the target data group.

The availability deciding section 78 determines the classification accuracy of the positive example evaluation classifier 62 associated with a corresponding target data group, and the classification accuracy of the negative example evaluation classifier 64 associated with the corresponding target data group.

The availability deciding section 78 decides whether or not to use a plurality of pieces of target data included in the corresponding target data group as negative example training data (A) for training the classifier 30*b*.

Note that, in the present embodiment, the classifier 30 does not necessarily need to have two classification classes, and a classifier that enables classification into three or more classes (that is, has a plurality of positive classes different from one another) may also be adopted.

A case where there are three positive classes in the classifier 30*b* will be described below by way of example. Here, the respective three classes are referred to as a first positive class, a second positive class, and a third positive class.

In this case, for example, on the basis of a sample image in which an object belonging to the first positive class appears, positive example feature amount data (B1) which is feature amount data indicating a feature amount corresponding to the positive example sample image is generated. Some of a plurality of pieces of positive example feature amount data (B1) are individually stored in the positive example training data generation unit 34, the first positive example evaluation data storage section 54*a*, and the second positive example evaluation data storage section 54*b*. The positive example feature amount data (B1) stored in the positive example training data generation unit 34 is referred to as positive example training data (B1). In addition, the positive example feature amount data (B1) stored in the first positive example evaluation data storage section 54*a* is referred to as first positive example evaluation data (B1). Moreover, the positive example feature amount data (B1) stored in the second positive example evaluation data storage section 54*b* is referred to as second positive example evaluation data (B1).

In addition, for example, on the basis of a sample image in which an object belonging to the second positive class appears, positive example feature amount data (B2) which is feature amount data indicating a feature amount corresponding to the positive example sample image is generated. Some of a plurality of pieces of positive example feature amount data (B2) are individually stored in the positive example training data generation unit 34, the first positive example evaluation data storage section 54*a*, and the second positive example evaluation data storage section 54*b*. The positive example feature amount data (B2) stored in the positive example training data generation unit 34 is referred to as positive example training data (B2). In addition, the positive example feature amount data (B2) stored in the first positive example evaluation data storage section 54*a* is referred to as first positive example evaluation data (B2). Moreover, the positive example feature amount data (B2) stored in the second positive example evaluation data storage section 54*b* is referred to as second positive example evaluation data (B2).

Further, for example, on the basis of a sample image in which an object belonging to the third positive class appears, positive example feature amount data (B3) which is feature amount data indicating a feature amount corresponding to the positive example sample image is generated. Some of a plurality of pieces of positive example feature amount data (B3) are individually stored in the positive example training data generation unit 34, the first positive example evaluation data storage section 54*a*, and the second positive example evaluation data storage section 54*b*. The positive example feature amount data (B3) stored in the positive example training data generation unit 34 is referred to as positive example training data (B3). In addition, the positive example feature amount data (B3) stored in the first positive example evaluation data storage section 54a is referred to as first positive example evaluation data (B3). Moreover, the positive example feature amount data (B3) stored in the second positive example evaluation data storage section 54b is referred to as second positive example evaluation data (B3).

Then, the provisional evaluation classifier 60 that is a multi-class classification model and that is trained with the first positive example evaluation data (B1) stored in the first positive example evaluation data storage section 54a as positive examples for the first positive class, with the first positive example evaluation data (B2) stored in the first positive example evaluation data storage section 54a as positive examples for the second positive class, with the first positive example evaluation data (B3) stored in the first positive example evaluation data storage section 54a as positive examples for the third positive class, and with the first negative example evaluation data (A) stored in the first negative example evaluation data storage section 56a as negative examples is generated. For example, it is assumed that, according to input of an image, this provisional evaluation classifier 60 outputs a classification score indicating a probability that an object appearing in this image belongs to the first positive class, a probability that the object appearing in this image belongs to the second positive class, and a probability that the object appearing in this image belongs to the third positive class.

Then, for each of the plurality of pieces of negative example training data (A) stored in the negative example training data storage section 52, a classification score for each of the first positive class, the second positive class, and the third positive class is specified. Here, for example, a classification score outputted from the trained provisional evaluation classifier 60 when the negative example training data (A) is inputted to the provisional evaluation classifier 60 is specified.

For each of the first positive class, the second positive class, and the third positive class, negative example training data (A) corresponding to a classification score that satisfies a predetermined criterion is then specified as target data. For example, negative example training data (A) whose classification score for the first positive class is equal to or greater than a predetermined value is specified as first target data. In addition, negative example training data (A) whose classification score for the second positive class is equal to or greater than a predetermined value is specified as second target data. Moreover, negative example training data (A) whose classification score for the third positive class is equal to or greater than a predetermined value is specified as third target data.

By performing processing that is similar to the processing of S306, the first target data is classified into n1 first target data groups (T_HN(1)(1) through T_HN(1)(n1)). In addition, the second target data is classified into n2 second target data groups (T_HN(2)(1) through T_HN(2)(n2)). Further, the third target data is classified into n3 third target data groups (T_HN(3)1 through T_HN(3)(n3)).

Then, processing similar to the processing of S307 through S315 is executed on these target data groups.

In this case, regarding a plurality of pieces of first target data included in the first target data group, in the processing of S308, a negative example evaluation classifier 64(1)(j) which is trained with the first positive example evaluation data (B1) as positive examples for the first positive class, with the first positive example evaluation data (B2) as positive examples for the second positive class, with the first positive example evaluation data (B3) as positive examples for the third positive class, and with the first negative example evaluation data (A) as well as the plurality of pieces of first target data included in the first target data group T_HN(1)(j) as negative examples is generated.

In addition, in the processing of S309, a positive example evaluation classifier 62(1)(j) which is trained with the first positive example evaluation data (B1) and the plurality of pieces of first target data included in the first target data group T_HN(1)(j) as positive examples for the first positive class, with the first positive example evaluation data (B2) as positive examples for the second positive class, with the first positive example evaluation data (B3) as positive examples for the third positive class, and with the first negative example evaluation data (A) as negative examples is generated.

Further, in the processing of S310, an F value (F_AP(1)(j)) of the positive example evaluation classifier 62(1)(j) and a F value (F_AN(1)(j)) of the negative example evaluation classifier 64(1)(j) are calculated.

Thereafter, in the processing of S311, on the basis of the value of F_AP(1)(j) and the value of F_AN(1)(j), whether or not to use the plurality of pieces of first target data included in the first target data group T_HN(1)(j) as negative example training data (A) for training the classifier 30b is decided.

Similarly, regarding a plurality of pieces of second target data included in the second target data group, in the processing of S308, a negative example evaluation classifier 64(2)(j) which is trained with the first positive example evaluation data (B1) as positive examples for the first positive class, with the first positive example evaluation data (B2) as positive examples for the second positive class, with the first positive example evaluation data (B3) as positive examples for the third positive class, and with the first negative example evaluation data (A) as well as the plurality of pieces of second target data included in the second target data group T_HN(2)(j) as negative examples is generated.

In addition, in the processing of S309, a positive example evaluation classifier 62(2)(j) which is trained with the first positive example evaluation data (B1) as positive examples for the first positive class, with the first positive example evaluation data (B2) and the plurality of pieces of second target data included in the second target data group T_HN(2)(j) as positive examples for the second positive class, with the first positive example evaluation data (B3) as positive examples for the third positive class, and with the first negative example evaluation data (A) as negative examples is generated.

Further, in the processing of S310, an F value (F_AP(2)(j)) of the positive example evaluation classifier 62(2)(j) and a F value (F_AN(2)(j)) of the negative example evaluation classifier 64(2)(j) are calculated.

Thereafter, in the processing of S311, on the basis of the value of F_AP(2)(j) and the value of F_AN(2)(j), whether or not to use the plurality of pieces of second target data included in the second target data group T_HN(2)(j) as negative example training data (A) for training the classifier 30b is decided.

Similarly, regarding a plurality of pieces of third target data included in the third target data group, in the processing of S308, a negative example evaluation classifier 64(3)(j) which is trained with the first positive example evaluation data (B1) as positive examples for the first positive class, with the first positive example evaluation data (B2) as positive examples for the second positive class, with the first positive example evaluation data (B3) as positive examples for the third positive class, and with the first negative example evaluation data (A) as well as the plurality of pieces of third target data included in the third target data group T_HN(3)(j) as negative examples is generated.

In addition, in the processing of S309, a positive example evaluation classifier 62(3)(j) which is trained with the first positive example evaluation data (B1) as positive examples for the first positive class, with the first positive example evaluation data (B2) as positive examples for the second positive class, with the first positive example evaluation data (B3) and the plurality of pieces of third target data included in the third target data group T_HN(3)(j) as positive examples for the third positive class, and with the first negative example evaluation data (A) as negative examples is generated.

Further, in the processing of S310, an F value (F_AP(3)(j)) of the positive example evaluation classifier 62(3)(j) and a F value (F_AN(3)(j)) of the negative example evaluation classifier 64(3)(j) are calculated.

Thereafter, in the processing of S311, on the basis of the value of F_AP(3)(j) and the value of F_AN(3)(j), whether or not to use the plurality of pieces of third target data included in the third target data group T_HN(3)(j) as negative example training data (A) for training the classifier 30b is decided.

Through the above processing, first target data, second target data, and third target data that have been decided not to be used as negative example training data (A) for training the classifier 30b are removed from the negative example training data storage section 52 in the processing of S313.

In the above example, there is a possibility that one piece of negative example training data (A) may be specified as target data for a plurality of positive classes. Further, the plurality of positive classes may be decided, in a duplicate manner, not to be used as negative example training data (A) for training the classifier 30b. In the present embodiment, it is assumed that such target data is also removed from the negative example training data storage section 52 in the processing of S313.

As described above, the present embodiment can also be applied to a case where the classifier 30b is a multi-class classification model.

In the present embodiment, in the above manner, data that should be handled as a positive example in the classifier 30b can appropriately be removed from training data that has been used to train the classifier 30a. In such a manner, according to the present embodiment, it is possible to reuse training data that has been used to train the classifier 30a, to train the classifier 30b.

Note that the present invention is not limited to the embodiment described above.

For example, the classifier 30, the provisional evaluation classifier 60, the positive example evaluation classifier 62, or the negative example evaluation classifier 64 may be an SVM having any kernel. In addition, the classifier 30, the provisional evaluation classifier 60, the positive example evaluation classifier 62, or the negative example evaluation classifier 64 may be a classifier that uses a method such as a K-nearest neighbors method, logistic regression, or a boosting method such as AdaBoost. In addition, the classifier 30, the provisional evaluation classifier 60, the positive example evaluation classifier 62, or the negative example evaluation classifier 64 may be implemented by a neural network, a naive Bayes classifier, a random forest, a decision tree, etc.

In addition, the classifier 30, the provisional evaluation classifier 60, the positive example evaluation classifier 62, or the negative example evaluation classifier 64 may output a binary classification score indicating whether or not to indicate that an object appearing in an input image belongs to a positive class.

In addition, a plurality of regions may be extracted from an input image, and the estimation unit 44 may estimate, for each region, whether or not an object appearing in an image of the region belongs to a positive class.

Moreover, the specific text strings or numbers in the above description as well as the specific text strings or numbers in the drawings are examples, and there is no limitation to these text strings or numbers.

The invention claimed is:

1. A negative example availability deciding apparatus comprising:
    a first classifier generation section that generates a first classifier trained with given target data as a positive example;
    a second classifier generation section that generates a second classifier trained with the target data as a negative example;
    a classification accuracy determination section that determines classification accuracy of the first classifier and classification accuracy of the second classifier by using given evaluation data; and
    an availability deciding section that decides, on a basis of the classification accuracy of the first classifier and the classification accuracy of the second classifier, whether or not to use the target data as negative example training data for training another classifier.

2. The negative example availability deciding apparatus according to claim 1, wherein
    the first classifier generation section generates the first classifier that is trained with the target data and common positive example data as positive examples and with common negative example data as a negative example, and
    the second classifier generation section generates the second classifier that is trained with the common positive example data as a positive example and with the target data and the common negative example data as negative examples.

3. The negative example availability deciding apparatus according to claim 2, further comprising:
    a third classifier generation section that generates a third classifier trained with the common positive example data as a positive example and with the common negative example data as a negative example; and
    a target data specifying section that uses the third classifier to specify the target data from a plurality of pieces of given negative example training data.

4. The negative example availability deciding apparatus according to claim 3, wherein the target data specifying section uses the third classifier and positive example training data that is to be used as a positive example for training the other classifier, to specify the target data from the plurality of pieces of negative example training data.

5. The negative example availability deciding apparatus according to claim 1, wherein
    the first classifier generation section generates, for each of a plurality of target data groups, the first classifier that is associated with a corresponding one of the target data groups and that is trained with a plurality of pieces of the target data included in the target data group as positive examples, the second classifier generation section generates the second classifier that is associated with the target data group and that is trained with a plurality of pieces of the target data included in the target data group as negative examples, the classification accuracy determination section determines classification accuracy of the first classifier associated with the target data group and classification accuracy of the second classifier associated with the target data group, and the availability deciding section decides, on a basis of the classification accuracy of the first classifier associated with the target data group and the classification accuracy of the second classifier associated with the target data group, whether or not to use the plurality of pieces of target data included in the target data group as negative example training data for training the other classifier.

6. A negative example availability deciding method comprising:

generating a first classifier trained with given target data as a positive example;

generating a second classifier trained with the target data as a negative example;

determining classification accuracy of the first classifier and classification accuracy of the second classifier by using given evaluation data; and deciding, on a basis of the classification accuracy of the first classifier and the classification accuracy of the second classifier, whether or not to use the target data as negative example training data for training another classifier.

7. A non-transitory, computer readable storage medium containing a computer program, which when executed by a computer, causes the computer to perform a method by carrying out actions, comprising:

generating a first classifier trained with given target data as a positive example;

generating a second classifier trained with the target data as a negative example;

determining classification accuracy of the first classifier and classification accuracy of the second classifier by using given evaluation data; and deciding, on a basis of the classification accuracy of the first classifier and the classification accuracy of the second classifier, whether or not to use the target data as negative example training data for training another classifier.

* * * * *